Oct. 8, 1935.                R. E. SMITH                2,016,934
POWER TAKE-OFF MECHANISM
Original Filed Jan. 25, 1934    5 Sheets-Sheet 2
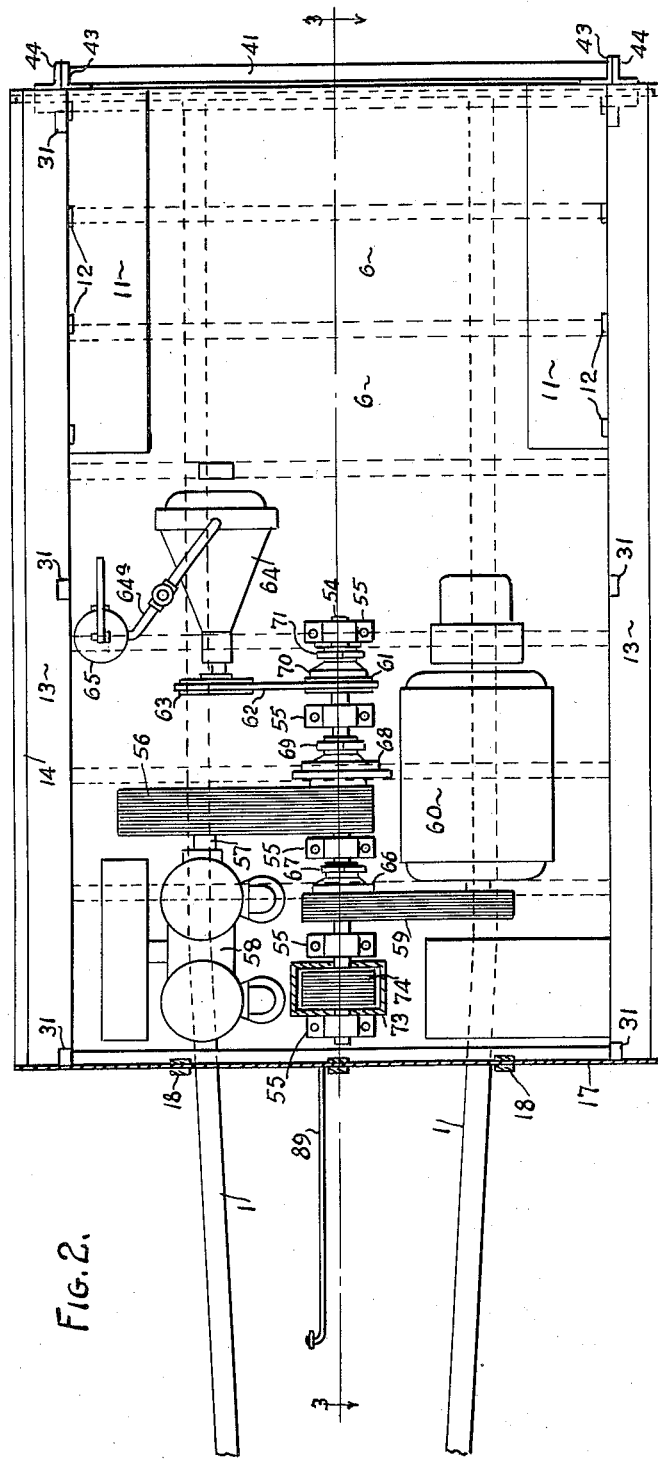
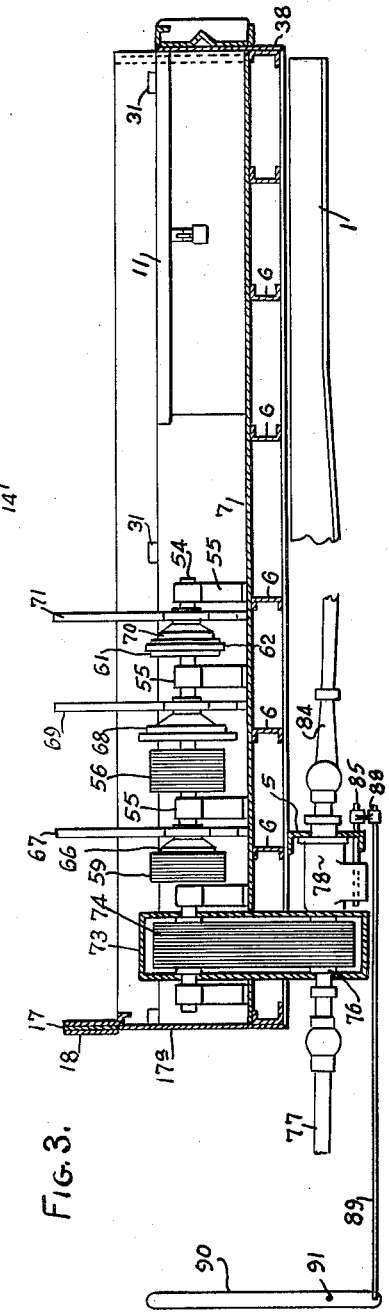
Inventor
RALPH E. SMITH,

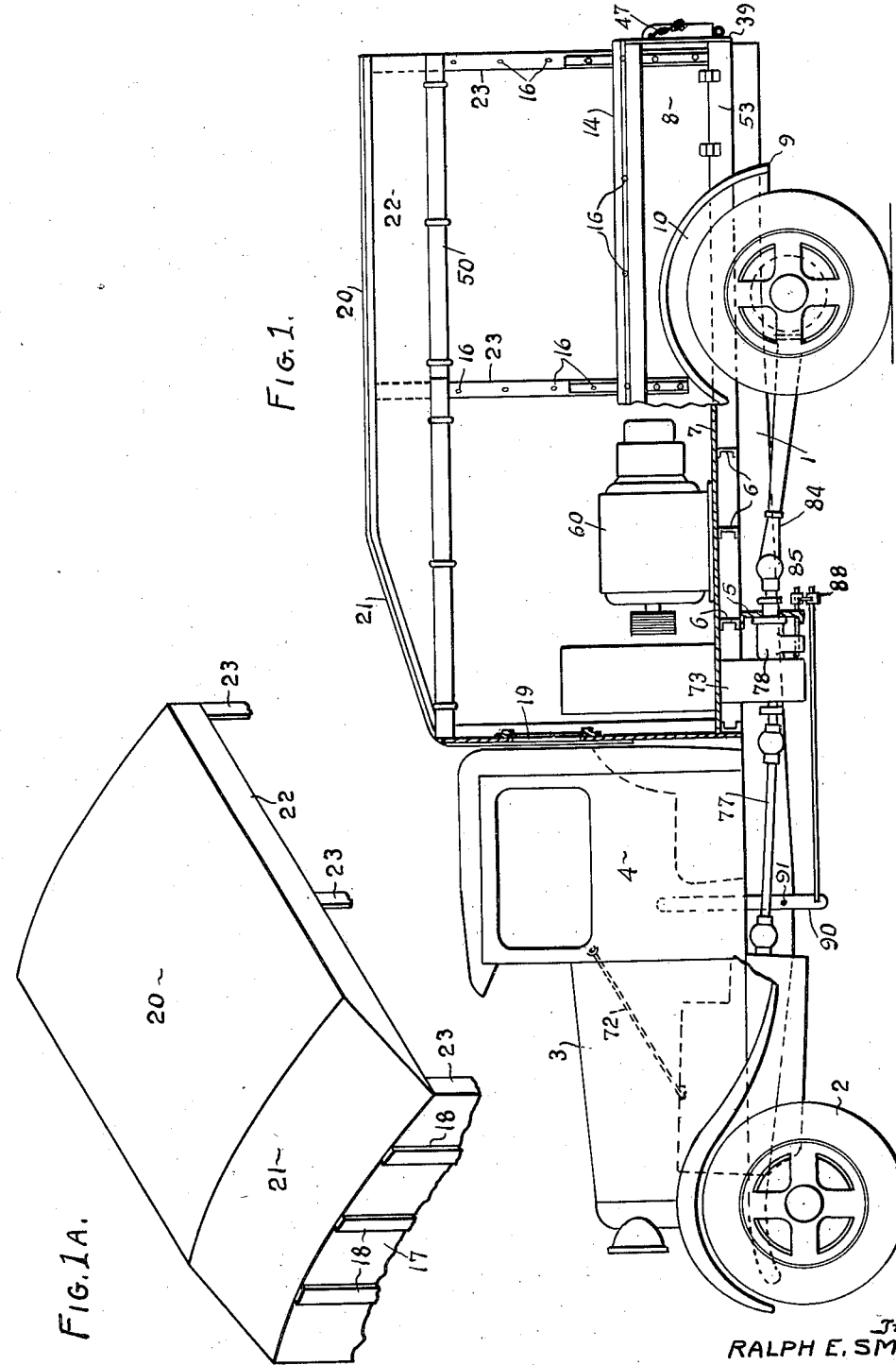

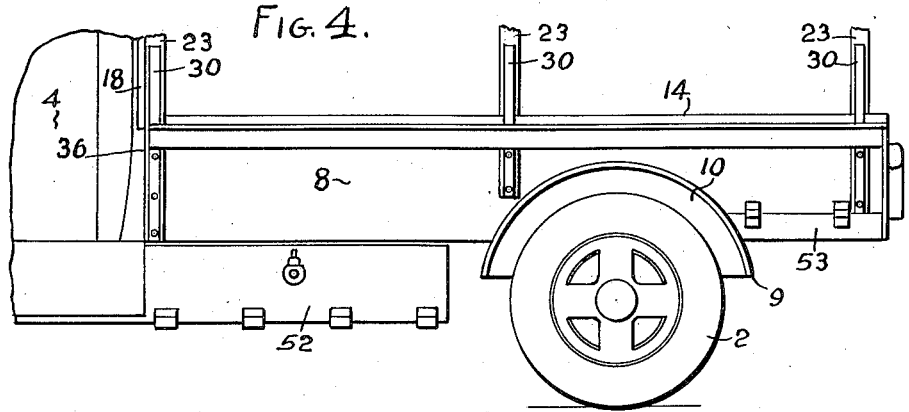
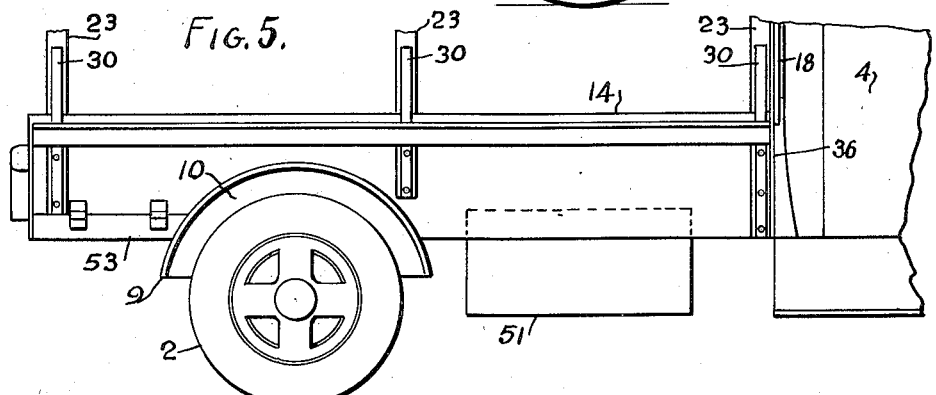
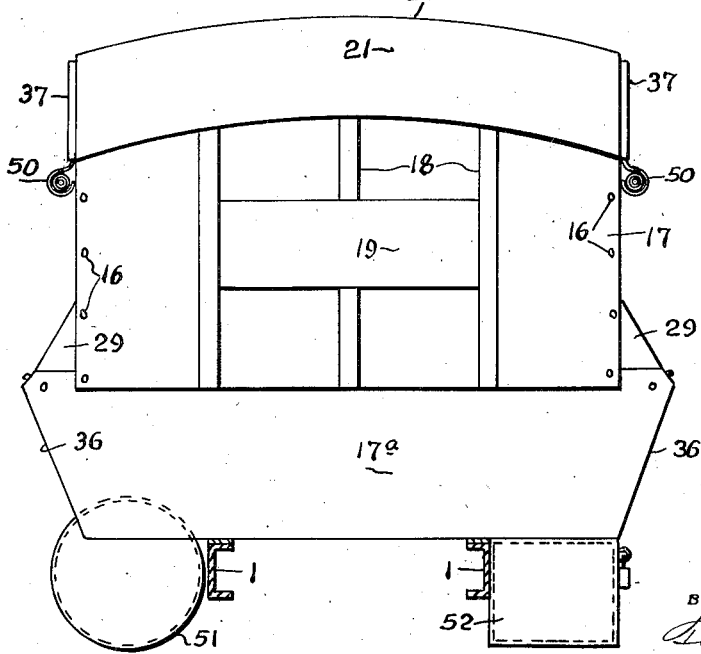

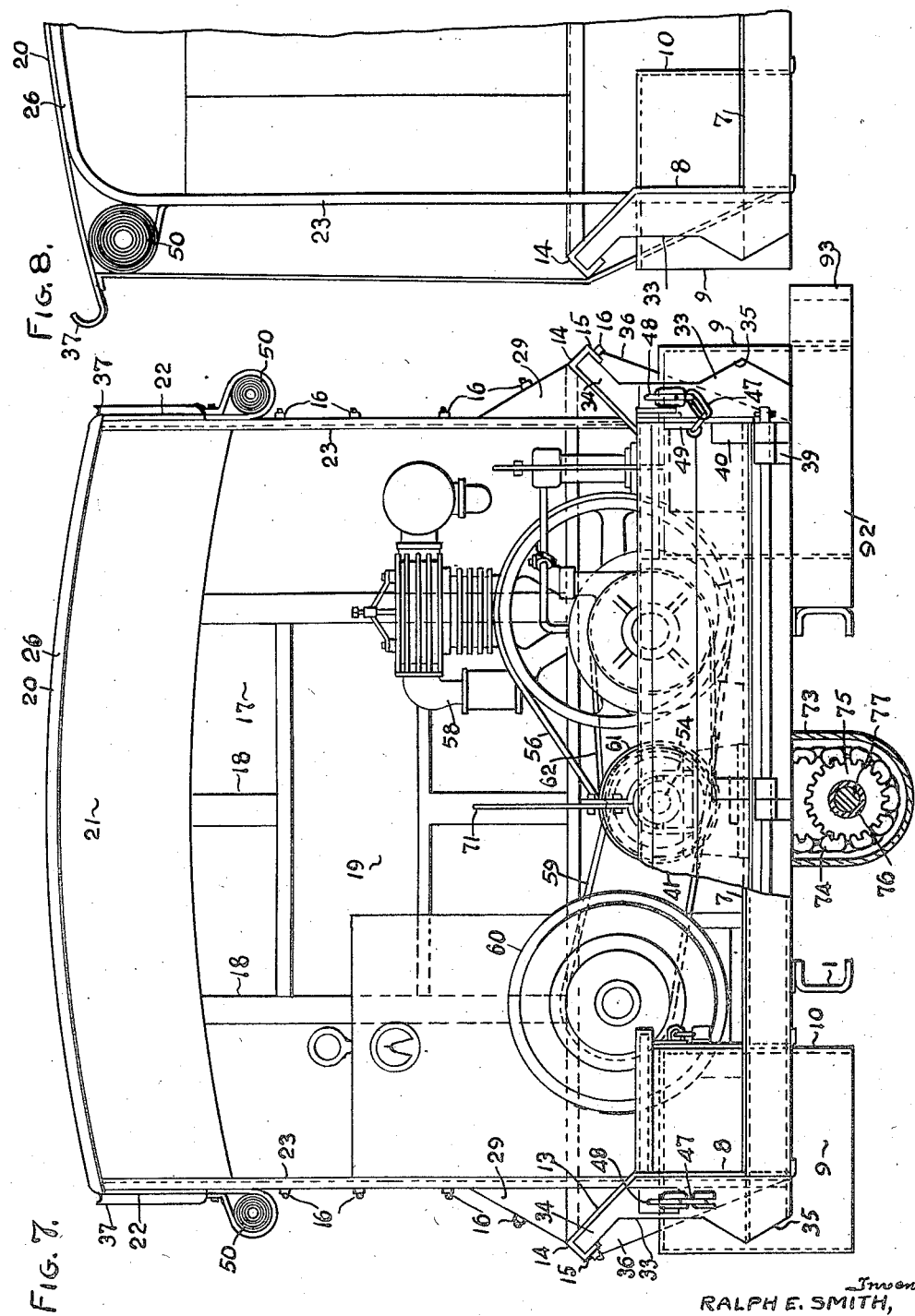

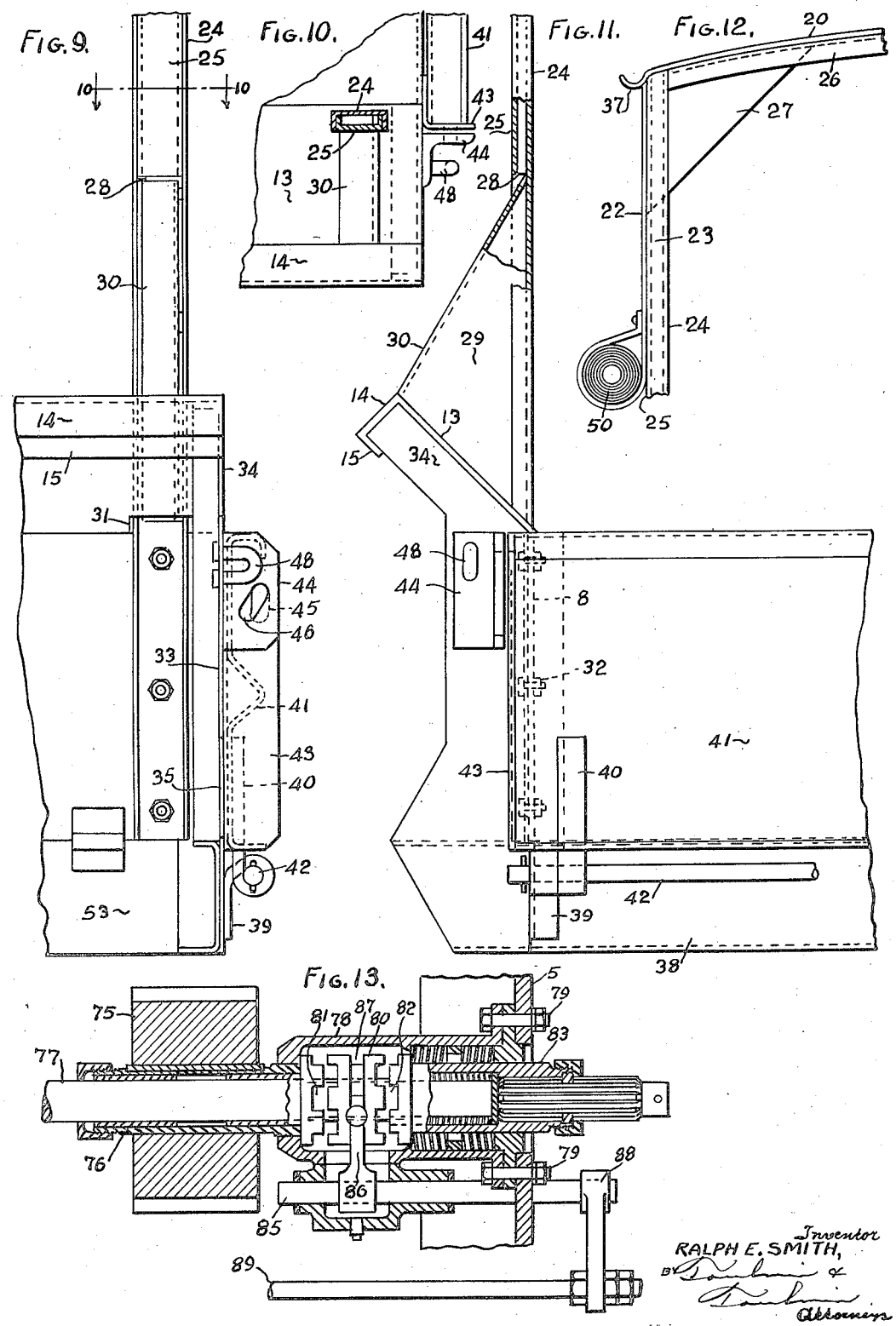

Patented Oct. 8, 1935

2,016,934

UNITED STATES PATENT OFFICE 2,016,934

POWER TAKE-OFF MECHANISM

Ralph E. Smith, Galion, Ohio, assignor to The Galion Metallic Vault Company, Galion, Ohio, a corporation of Ohio Original application January 25, 1934, Serial No. 708,203. Divided and this application June 11, 1934, Serial No. 729,938

4 Claims. (Cl. 180—53)

This invention relates to improvements in truck bodies, and has for its object to provide auxiliary apparatus to be carried on the truck and take-off mechanism, whereby these auxiliaries may be selectively connected to the engine of the truck.

It is a further object to provide, in connection with a truck body, a shaft mechanism by which various elements of machinery may be operated, together with means for connecting the shaft to the driving mechanism of the truck for operating the shaft and the mechanical parts attached thereto.

It is also an object to provide, in connection with a truck having a body thereon, a shaft and means for connecting the shaft to the power shaft of the truck, said means including power take-off mechanism adapted to be inserted into the drive shaft of the truck.

It is an object to provide, in connection with a removable body composed of sheet metal, a jack shaft located on and supported by the floor of the body, a generator supported by the floor of the body and operatively connected to the jack shaft, a compressor supported by the floor and operatively connected to the jack shaft, a pump supported by the floor of the body and operatively connected to the jack shaft, and a power take-off mechanism between the jack shaft and the drive shaft of the truck, whereby the truck motor may be used either for driving the truck or for operating the jack shaft and the mechanism operatively connected thereto.

These and other advantages will appear from the following description taken in connection with the drawings.

This application is a division of my application Serial No. 708,203, filed January 25, 1934.

Referring to the drawings:

Figure 1 is a side elevation of a truck to which applicant's body and top are attached, with parts of the body and top broken away.

Figure 1a is a perspective of the upper part of the top.

Figure 2 is a top plan view of the truck body with the front wall thereof in section, and showing the various mechanisms supported on the floor of the truck body.

Figure 3 is a section on the line 3—3 of Figure 2.

Figure 4 shows in side elevation the rear end of the truck with the top removed and parts of the standards broken away.

Figure 5 is a view similar to Figure 4 but taken from the opposite side thereof.

Figure 6 is an end elevation of the truck body and top.

Figure 7 is a rear elevation of the truck body and top with a part of the end gate broken away and a part of the gear casing shown in section.

Figure 8 is an end view of one side of a slightly modified form of body and top.

Figure 9 shows an enlarged view of the rear end of one side of the truck body, together with a part of one of the standards.

Figure 10 is a section on the line 10—10 of Figure 9.

Figure 11 shows the rear end of one corner of the truck body with the upper part of an end standard broken away and partly in section to show the relationship between the standard and the parts therefor.

Figure 12 shows an upper end corner of the top.

Figure 13 is a sectional view through a power take-off mechanism.

The truck body part of the present invention may be used in connection with trucks of various forms. In Figure 1 the body and top are shown assembled on a truck which has a frame 1, supported on the usual wheels 2 with a hood 3 for inclosing the truck motor, and a driver's cab 4 located just to the rear of the motor and the hood.

The frame consists in part of two longitudinally disposed channel irons which have between them, intermediate their ends, a transverse channel iron 5 used for supporting the power take-off, later to be described. On top of the frame and supported by the longitudinal channel irons are transverse channel irons 6 which support the floor 7 of the body of the truck. These channel irons 6 may be formed integral with the body parts and be removable with the body parts from the frame, or these transverse channel irons may be welded to the bottom and also welded to the longitudinally disposed channel irons forming parts of the frame.

Formed integral with the bottom 7 are sides 8 extending upwardly therefrom. Each side is cut away to accommodate a fender 9 which extends inwardly into the body in order to protect the pair of wheels on each side of the body. The inside edge of each fender is provided with a wall member 10, which also forms the inside wall of a tool box located on the inside of the body and at the side thereof. The top of this tool box is indicated by the numeral 11 and is attached to the main part of the box by means of hinges 12.

The upper edge of each side of the body extends upwardly and outwardly at 13, and downwardly and outwardly at 14, and downwardly and inwardly at 15. This flange structure gives strength and rigidity to the upper edge of the side, and provides means by which strengthening braces may be attached to the side of the body.

The part 15 is provided with buttons 16 to which a curtain may be attached. The front end of the body is composed of sheet metal and is divided into an upper part 17 and a lower part 17a, suitably connected. The upper part is strengthened by means of vertically extending ribs 18, and also has a hole therein to accommodate a window 19 through which a person within the body may look out toward the front of the truck.

The top of the body, which is composed of sheet metal and welded to the upper edge of the front, has an arcuate substantially horizontal part 20, and an arcuate and forwardly and downwardly inclined front part 21. It is this part 21 which rests upon the upper edge of the front end of the body. On each side and extending downwardly from the parts 20 and 21 is an apron 22, to which the upper ends of standards 23 are attached. The standards are composed of two channel members, an inner one 24 and an outer one 25. The inner channel member has its arms extending outwardly, which inclose the arms of the outer channel member. By this arrangement the outer face of each standard is smooth. The channel irons are suitably attached so they form a unitary rigid standard member.

The rear end of the top part 20 has a downwardly extending flange 26. To this flange and to the end standards are attached triangular braces 27 (Figure 12). These braces are welded to the flange 26 and to the standards. In order to accommodate one edge of the brace 27 the inside channel iron is cut away so that this edge is inserted into the body of the standard and is welded to the standard.

The lower end of each standard adjacent the body is cut away at 28 to provide for a brace 29. This brace is triangular in shape, with one edge fitting in the cut-away part of the standard, with another edge engaging the part 13 of the side, and another edge exposed with an outwardly extending flange 30 to provide a flat outer surface (Figure 9). In order that the standards may fit on the outside of the side members of the body the parts 13 are provided with holes 31 through which the lower ends of the standards project. These standards are removably attached to the body by means of bolts 32.

In order to strengthen the rear end of each side of the body and also the parts 13, 14 and 15 (Figures 7 and 11) a rear brace 33 is provided which has an arm 34 extending along the part 13 and in engagement with the parts 14 and 15. This brace extends all the way from the part 14 to the bottom of the side of the body, and adjacent the bottom of the body has a laterally extending projection 35. At the front of the body and at each end of the part 17a is an extension 36, which forms a brace for the lateral flanges of the sides of the body (Figure 7). These lateral extensions 36 cooperate with the braces 29 at the front end of the body, for strengthening the front ends of the sides.

On each side of the top beneath the parts 20 and 21 is a gutter 37. Across the rear end of the frame is a plate 38, which is in alignment with the lower end of the braces 33 (Figure 7). On each end of the plate 38 is a hinge element 39, while a second hinge element 40 is attached at each end to an end gate 41. The various hinge elements are connected together by means of a transverse shaft 42. As shown in Figure 7, there are three hinges, one at each side, and one in the center for supporting the end gate upon the end plate 38.

Each end of the end gate has a rearwardly extending flange 43, while each brace 33 has a rearwardly extending flange 44, one adjacent each of the flanges 43 on the end gate. In the flange 43 there is a vertical slot 45, while in the flange 44 there is a forwardly inclined slot 46. The slots in the flanges 43 and in the flanges 44 are adapted to align when the end gate is in closed position. On each flange 44 is an eye 48 to which one end of a chain 47 is attached. On the other end of this chain is a hook 49 adapted to fit in the slots of the flanges 43 and 44. When the hook is in these slots it tends to force, by its downward movement, the end gate against the end of the body because of the wedging action produced by the inclination of one slot with relation to the other. On each side of the top and suitably supported beneath the part 22 is a curtain 50. Each curtain is provided with holes to receive the buttons 16. These buttons 16 are not only provided along the part 15 but are also provided on the outer surfaces of the standards.

Beneath the body and at one side thereof is an air tank 51, while on the other side opposite the tank 51 is a tool box 52 (Figure 6). At the rear end on each side of the body is a container 53 for any suitable purpose. Supported on the floor of the body, substantially in the center thereof and arranged longitudinally thereof (Figures 2 and 3), is a jack shaft 54 supported by suitable bearings 55. This shaft is composed of nickel chromium steel. On this shaft is a pulley for receiving a plurality of V-shaped belts 56 connecting the pulley on the jack shaft to a pulley on one end of a shaft 57 used for operating a compressor 58, connected by a suitable pipe means to the tank 51 beneath the body of the truck.

By means of V-shaped belts 59 a second pulley on the jack shaft is connected to a pulley on the shaft of the generator 60. This generator is used for producing current for welding and lighting purposes. There is also mounted on the shaft 54 a third pulley 61, which is connected by means of a belt 62 to a pulley 63 for operating a centrifugal pump 64. To this centrifugal pump is connected a hand pump 65 by means of a pipe 64a.

The pulleys for the belts 56, 59 and 62 are loosely mounted on the jack shaft 54 and may be caused to rotate therewith by means of certain clutches. The clutch 66, operated by means of a clutch lever 67, is used for connecting the generator pulley to the jack shaft, while a clutch 68 operated by means of a clutch lever 69, is used for connecting the compressor pulley to the jack shaft, and a clutch member 70, operated by a clutch lever 71, is used for connecting the pulley 61 to the jack shaft for operating the centrifugal pump 64.

There is provided a governor control rod 72 operated from the cab of the truck. Surrounding the sprocket adjacent the front end of the jack shaft is a casing 73 which extends downwardly and surrounds a sprocket on a shaft 76 forming part of the drive shaft of the vehicle (Figure 3). Connecting the sprocket on the jack shaft and the sprocket on the shaft 76 is a silent chain drive 74. The sprocket on the shaft 76 is shown in Figure 7 and is indicated by the numeral 75.

The shaft 76 is in the form of a sleeve, which is rotatably mounted on one end of a driving shaft 77 and in one end of a take-off housing 78. This take-off housing is supported by means of bolts 79 on the transverse channel iron 5. The driving shaft 17 extends rearwardly into the take-off housing beyond the end of the hollow shaft or sleeve 76, and has slidably mounted thereon a clutch member 80 adapted to rotate with the shaft.

On this clutch member and the end of the shaft or sleeve 76, within the take-off housing, are cooperating clutch elements 81 so that when the clutch member is moved toward the left, as shown in Figure 13, the rotation of the shaft 77 and the clutch member will cause the sleeve to rotate and thereby rotate the gear 75. On the clutch member 80 and one end of a shaft 83 are cooperating clutch elements 82, whereby on movement of the clutch member to the right and the coengagement of the clutch elements 82, the driven shaft 83 will be caused to rotate by the rotation of the driving shaft 77. The driven shaft 83 is connected by a universal joint to a shaft 84, operatively connected to the driving axle of the truck.

Slidably supported in the take-off housing is a rod 85 which has thereon an arm 86 for engagement in a groove 87 in the clutch member for shifting the clutch longitudinally of the shaft 77, whereby the clutch elements may be caused to engage. This rod 85 has on the end thereof, without the take-off housing, an arm 88 attached at one end to the rod 85 and at its other end to a link 89 (Figures 3 and 13), which extends forwardly and is attached to one end of a lever 90 pivoted at the point 91 to some suitable part of the cab. The upper end of this lever is located in the cab in a position to be operated by the driver of the truck.

To the rear end of the truck, beneath the floor of the body, there is provided an arm 92 which extends beyond the side of the body and has therein a hole 93 in which a boom shaft or any other suitable structure may be inserted (Figure 9). The inner end of this arm 92 is attached to one of the longitudinally extending channel irons that form a part of the frame 1.

A plurality of V-shaped belts and V-grooved pulleys may be used for driving the jack shaft from the hollow shaft or sleeve 76. All parts of the body and the braces therefor are integral or welded together, and all parts of the top are welded together.

I desire to comprehend within my invention such modifications as may be embraced within my claims and the scope of my invention.

Having thus fully described my invention, what I claim as new and desire to secure by Letters Patent, is:

1. In a power take-off mechanism for a truck, a housing, a driving shaft having one end extending into the housing, a hollow take-off shaft rotatably mounted on the driving shaft and extending into the housing, a truck propeller shaft having a recess in the end thereof adapted to rotatably receive the end of said driving shaft, anti-friction bearings in said recess between said driving shaft and said propeller shaft, anti-friction bearings between the outside of the end of said propeller shaft and said housing, said hollow shaft and said propeller shaft at their ends having clutch teeth, and a clutch member with corresponding teeth slidably mounted on said driving shaft and arranged to selectively connect said driving shaft with said propeller shaft or said hollow shaft, said anti-friction bearings being arranged in substantially the same transverse plane whereby to concentrate the support of said driving shaft and said propeller shaft in said housing at substantially the same location so as to avoid cross thrusts and couples therein.

2. In a power take-off mechanism for a truck, a housing, a driving shaft having one end extending into the housing, a hollow take-off shaft rotatably mounted on the driving shaft and extending into the housing, a truck propeller shaft having a recess in the end thereof adapted to rotatably receive the end of said driving shaft, anti-friction bearings in said recess between said driving shaft and said propeller shaft, anti-friction bearings between the outside of the end of said propeller shaft and said housing, said hollow shaft and said propeller shaft at their ends having clutch teeth, and a clutch member with corresponding teeth slidably mounted on said driving shaft and arranged to selectively connect said driving shaft with said propeller shaft or said hollow shaft, said anti-friction bearings being arranged in substantially the same transverse plane whereby to concentrate the support of said driving shaft and said propeller shaft in said housing at substantially the same location so as to avoid cross thrusts and couples therein, said clutch member having teeth on its opposite faces to engage the teeth on the ends of said propeller shaft and said take-off shaft when said clutch member is moved in opposite directions respectively.

3. In a power take-off mechanism for a truck, a housing, a driving shaft having one end extending into the housing, a hollow take-off shaft rotatably mounted on the driving shaft and extending into the housing, a truck propeller shaft having a recess in the end thereof adapted to rotatably receive the end of said driving shaft, anti-friction bearings in said recess between said driving shaft and said propeller shaft, anti-friction bearings between the outside of the end of said propeller shaft and said housing, said hollow shaft and said propeller shaft at their ends having clutch teeth, and a clutch member with corresponding teeth slidably mounted on said driving shaft and arranged to selectively connect said driving shaft with said propeller shaft or said hollow shaft, said anti-friction bearings being arranged in substantially the same transverse plane whereby to concentrate the support of said driving shaft and said propeller shaft in said housing at substantially the same location so as to avoid cross thrusts and couples therein, said anti-friction bearings comprising roller bearings arranged to suport said shafts relatively to one another and to said housing.

4. In a truck having a driver's cab, a propelling shaft and a body, said propelling shaft being in independently-movable sections, a take-off housing supporting the ends of said sections, a hollow shaft rotatably supported by the housing and in which is rotatably mounted one of said sections a jack shaft rotatably mounted on the body and operatively connected to the hollow shaft, a clutch member in the housing adapted selectively either to interconnect said shaft sections or to connect one section thereof to the hollow shaft, and means in the cab for operating the clutch member.

RALPH E. SMITH